(12) United States Patent  (10) Patent No.: US 8,949,653 B1
Kayan et al.  (45) Date of Patent: Feb. 3, 2015

(54) EVALUATING HIGH-AVAILABILITY CONFIGURATION

(71) Applicant: Symantec Corporation, Mountain View, CA (US)

(72) Inventors: Rohan Kumar Kayan, Bihar (IN); Ravikant Ambadas Gedam, Dist-Yavatmal (IN); Santosh Kumar Konduru, Nalgonda (IN)

(73) Assignee: Symantec Corporation, Mountain View, CA (US)

( * ) Notice: Subject to any disclaimer, the term of this patent is extended or adjusted under 35 U.S.C. 154(b) by 251 days.

(21) Appl. No.: 13/660,072

(22) Filed: Oct. 25, 2012

Related U.S. Application Data

(60) Provisional application No. 61/679,658, filed on Aug. 3, 2012.

(51) Int. Cl.
 *G06F 11/00* (2006.01)
(52) U.S. Cl.
 USPC .............................................. 714/1; 714/41
(58) Field of Classification Search
 CPC . G06F 11/008; G06F 11/3006; G06F 11/301; G06F 11/3034
 USPC ................................................. 714/1, 21, 41
 See application file for complete search history.

(56) References Cited

U.S. PATENT DOCUMENTS

| | | | |
|---|---|---|---|
| 7,325,055 B2* | 1/2008 | Fukunari et al. | 709/224 |
| 8,578,205 B2* | 11/2013 | Leggette et al. | 714/6.2 |
| 2002/0069317 A1* | 6/2002 | Chow et al. | 711/104 |
| 2003/0046615 A1* | 3/2003 | Stone | 714/47 |
| 2004/0205373 A1* | 10/2004 | Shoaib et al. | 714/1 |
| 2006/0085664 A1* | 4/2006 | Nakamura et al. | 714/1 |
| 2006/0095705 A1* | 5/2006 | Wichelman et al. | 711/171 |
| 2006/0245411 A1* | 11/2006 | Chen et al. | 370/350 |
| 2007/0168336 A1* | 7/2007 | Ransil et al. | 707/3 |
| 2008/0005539 A1* | 1/2008 | Velhal et al. | 712/220 |
| 2008/0140690 A1* | 6/2008 | Cuomo et al. | 707/100 |
| 2009/0204795 A1* | 8/2009 | Nasuto et al. | 712/227 |
| 2009/0248597 A1* | 10/2009 | Fickie et al. | 706/13 |
| 2011/0004457 A1* | 1/2011 | Haviv et al. | 703/21 |
| 2011/0072108 A1* | 3/2011 | Gopalakrishnan | 709/217 |
| 2011/0225121 A1* | 9/2011 | Cooper et al. | 707/634 |
| 2011/0276951 A1* | 11/2011 | Jain | 717/140 |
| 2012/0266011 A1* | 10/2012 | Storer et al. | 714/1 |
| 2013/0297796 A1* | 11/2013 | Young et al. | 709/226 |

* cited by examiner

*Primary Examiner* — Joshua Lohn
(74) *Attorney, Agent, or Firm* — Campbell Stephenson LLP (57) ABSTRACT

Various systems and methods for evaluating and controlling high-availability configuration. For example, one method can involve detecting fault tolerance parameters that can be available within a datacenter. The method also involves identifying a set of fault tolerance parameters that applies to an application. Identifying the fault tolerance parameters that apply to the application involves detecting whether the application is associated with one or more high-availability applications. The method also involves generating an index value for the application. The index value is based on the fault tolerance parameters associated with the application and provides an objective measure of the fault tolerance of the application.

20 Claims, 5 Drawing Sheets

FIG. 5

EVALUATING HIGH-AVAILABILITY CONFIGURATION

PRIORITY CLAIM

This application claims the benefit of priority of U.S. Provisional Patent Application No. 61/679,658, titled "Managing Resources In a Highly Available Computing Environment," filed on Aug. 3, 2012, and naming Rohan Kumar Kayan, Ravikant Gedam, Santosh Konduru as inventors. The aforementioned application is hereby incorporated by reference herein, in its entirety and for all purposes.

FIELD OF THE INVENTION

This invention relates to fault tolerant computing and, more particularly, to configuring fault tolerant applications in a datacenter.

DESCRIPTION OF THE RELATED ART

In computing environments, hardware and software components occasionally fail. It is the purview of high-availability technology to minimize the impact of such failures. High-availability can take a number of forms, such as multiple redundancies and failover configurations. Both hardware and software can be configured to provide high-availability.

High-availability is particularly important in datacenters. Users often run applications in datacenters in part because of the high-availability features provided by datacenters. For example, a user can run a database application on a computer system in a datacenter configured to provide high-availability. If the database application fails, the datacenter can automatically fail the database application over to another computer system such that the user does not experience any performance degradation and is unaware of the fail-over.

Given that datacenters can include numerous applications and numerous high-availability providers, managing the high-availability characteristics of the various applications can be a daunting task, requiring considerable knowledge and skill on the part of a datacenter administrator. For example, a datacenter administrator may access information from several different sources in order to detect whether and what manner of high-availability protection is provided for an application. The distributed nature of existing information describing high-availability configuration of a datacenter can lead to confusion and errors.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

In a computing environment capable of executing multiple applications, such as a datacenter, high-availability is often provided via a number of hardware and/or software high-availability providers. In typical implementations, a user, such as a datacenter administrator, has no way to quickly determine and compare the fault tolerance protections in place for the various applications. In order to detect which faults each of the high-availability providers protects against and which high-availability providers are protecting each application, the datacenter administrator typically accesses various independent sources of information (e.g., various manuals, configuration files, and the like), such as application configuration information and/or high-availability configuration information for each of several different items of hardware and/or software and/or for each of several different manufacturers of each type of item. This process can be time consuming and can lead to incorrect information and decisions regarding datacenter configuration.

Figure 1:
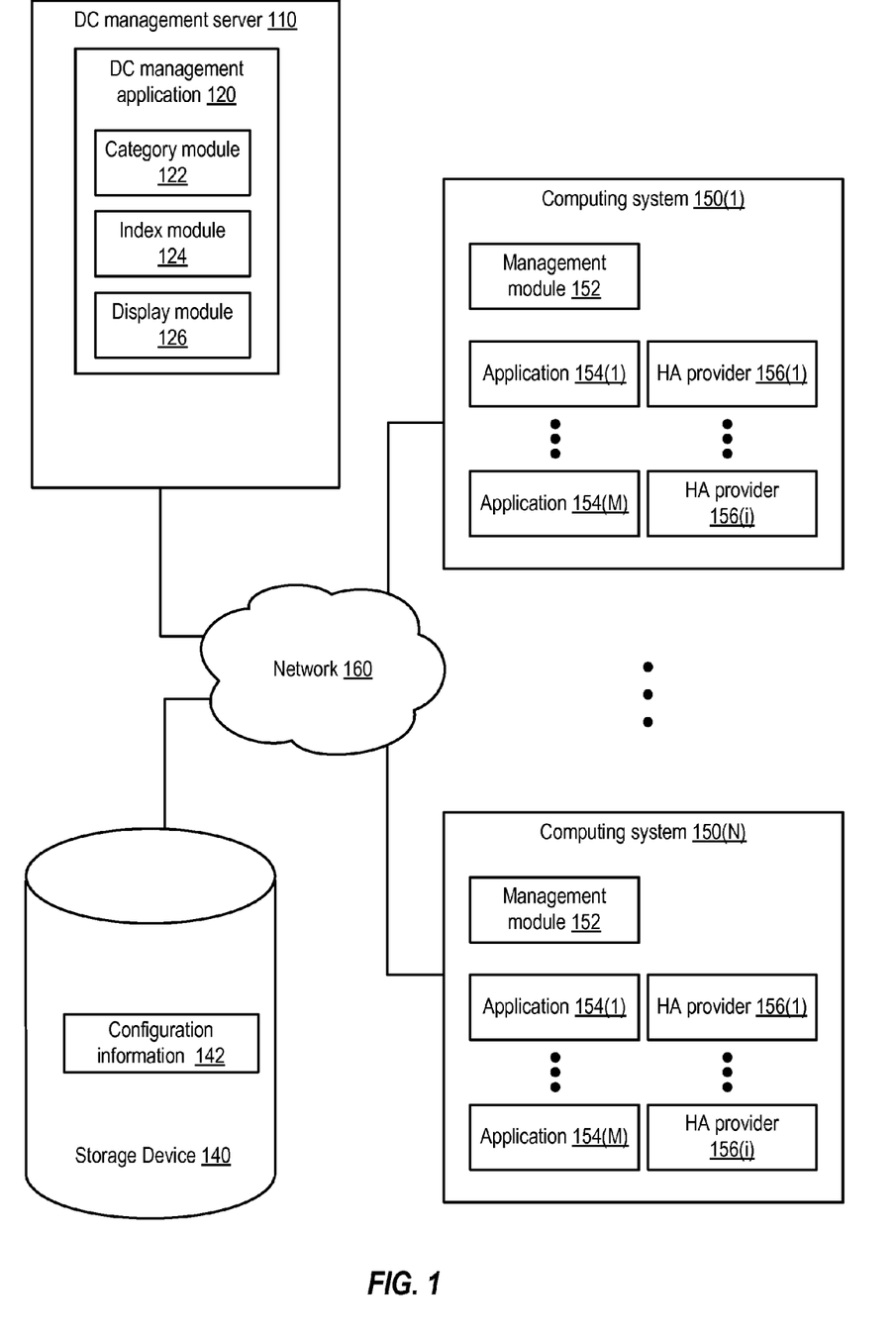
FIG. 1 is a block diagram of a system configured to categorize fault tolerance parameters from high-availability providers, according to one embodiment.

FIG. 1 is a block diagram of a system configured to categorize fault tolerance parameters from high-availability providers. FIG. 1 shows an example computing environment. In one embodiment, the components shown in FIG. 1 are included in a datacenter. As shown, the environment of FIG. 1 includes a datacenter management server 110, a storage device 140, and several computing systems collectively referred to as computing systems 150, including computing system 150(1) to computing system 150(N). The datacenter management server 110, storage device 140, and computing systems 150 are coupled via a network 160. Network 160 can include a WAN (Wide Area Network), such as the Internet, one or more LANs (Local Area Networks), and/or one or more SANs (Storage Area Networks).

It will be noted that the variable identifiers "N", "M", and "i" are used to more simply designate the final element of a series of related or similar elements (e.g., backup clients). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Each computing system 150 can be implemented as a computing device such as a personal computer, laptop computer, server, personal digital assistant, cell phone, or the like. In one embodiment, one or more computing systems of computing systems 150 is implemented as a virtual machine. A virtual machine is a software implementation of a physical computer that executes computer instructions in the manner of physical computer hardware.

Computer systems 150 can also be configured as one or more clusters. For example, computing systems 150 can be interconnected at high speeds for the purpose of improving reliability, availability, serviceability, and/or performance via load balancing. Computer systems 150 can be configured with redundant interconnections and may appear to users as a single highly available system. Alternatively, instead of being operated as part of a cluster, one or more computing systems of computing systems 150 is configured as a standalone node.

Computer systems 150 include a plurality of applications 154(1) to 154(M). While multiple applications are shown on each of computing systems 150 in FIG. 1, one or more of computing systems 150 can include only a single application 154 in some embodiments. Applications 154 can each be a word processing program, email program, graphic editing program, database application, or the like. Applications 154 can include multiple instances of the same application. In one embodiment, an application 154 is implemented as a distributed application, such that at least a portion of that application executes on each of several different computing systems.

Computer systems 150 also include several high-availability providers 156(1) to 156(i). Each high availability provider is configured to perform a function that provides one or more types of high availability within the data center. As shown, each high-availability provider 156 is implemented as a separate module. A high-availability provider can be a discrete software application. High-availability providers 156 are configured to monitor one or more resources, such as an application or computing system, and take action if the resource is impaired. For example, if a high-availability provider detects that an application has failed, the high-availability provider can attempt to restart the application. This involves the high-availability provider selecting a location to restart the application, e.g., on the same computing system or on a different computing system. High-availability providers 156 can provide multiple levels of and types of fault tolerance protection. For example, the high-availability providers 156 can provide application-level fault tolerance protection, system-level fault tolerance protection, and/or site-level fault tolerance protection. A user, such as a datacenter administrator, configures high-availability providers 156 to perform the various actions, e.g., restart or failover, for the various resources, e.g., applications. Each high-availability provider 156 is configured to monitor one or more entities, such as computing systems and/or clusters and detect when a condition exists that affects operation of the monitored entities, such as a hardware or software failure. Each high-availability provider 156 is also configured to detect a condition that has the potential to affect operation of the monitored entities. In response to detecting the condition, each high-availability provider 156 is configured to perform corrective actions, e.g., restart or fail-over, to restore the monitored entities to operability.

As shown, each computing system 150 also includes a management module 152. Management module 152 is configured to monitor the status and configuration of applications 154, as well as the status and configuration of high-availability providers 156. For example, if an application failed on a first computing system and was failed-over to a second computing system by a given high-availability provider, the management modules detect and record this information, e.g., in a log. While each management module stores a separate log in one embodiment, in some embodiment, the management modules instead maintain a single distributed log by transmitting updates between the management modules. Management module 152 communicates the log information to a datacenter management application. Management module 152 is configured to report on the status and configuration of the applications and high-availability providers on the computing system on which the management module is implemented as well as the status and configuration of the computing system itself. Management module 152 can automatically generate a report including information indicating the status of applications 154 and high-availability providers 156, e.g., on a periodic basis, or can respond to a query, e.g., from a datacenter administrator, by transmitting information to a datacenter management application.

As shown, FIG. 1 includes a datacenter management server 110. Datacenter management server 110 is a computing device such as a personal computer, laptop computer, server, personal digital assistant, cell phone, or the like. Datacenter management server 110 acts as a management and administrative interface for the datacenter.

Datacenter management server 110 includes datacenter management application 120. Datacenter management application 120 is configured to be used by a user, for example a datacenter administrator, to configure computing systems and applications included in a datacenter. For example, datacenter management application 120 configures and controls applications 154. Datacenter management application 120 also configures and controls high-availability providers 156. Datacenter management application 120 is configured to generate queries to the computing systems in a datacenter. The queries request information that is collected by the datacenter management application, such as which high-availability providers are implemented on the computing systems, the status of the applications installed on the computing systems, as well as the status of the computing systems themselves, and the like. Datacenter management application 120 is also configured to receive information from the computing systems and process the received information. Datacenter management application 120 can use the received information to generate reports that can be viewed by a datacenter administrator to assess the status of applications and high-availability providers in the datacenter.

Datacenter management application 120 includes a category module 122. Category module 122 is configured to generate a list of fault tolerance parameters. Each fault tolerance parameter represents one or more actions that can be performed by a high-availability provider, such as a high-availability provider 156. While category module 122 can create the list manually in some embodiments, for example in response to receiving information identifying fault tolerance parameters from a datacenter administrator, in other embodiments category module 122 can instead automatically generate the list of fault tolerance parameters. Automatically generating a list of fault tolerance parameters involves category module 122 detecting the fault tolerance parameters provided by one or more high-availability applications. Detecting the fault tolerance parameters can involve category module 122 accessing configuration information associated with a high-availability provider 156, such as a configuration file associated with high-availability provider 156. Alternatively, category module can query high-availability provider 156, where the query requests information identifying which fault tolerance parameters are available and activated for one or more applications, and receiving a response to the query with the requested information. In response to detecting the fault tolerance parameters provided by the one or more high-availability providers, the category module 122 creates a list of the fault tolerance parameters.

Category module 122 is also configured to categorize high-availability providers 156. In one embodiment, this involves category module 122 detecting which fault tolerance parameters can be performed by each high-availability provider. The high-availability providers can be supplied by different vendors, can have different interfaces, and/or can be discovered via different discovery processes. Category module 122 can generate a table, such as table 1, that indicates which fault tolerance parameters are provided by the various high-availability providers. Table 1 shows a list of fault tolerance parameters. The list shown can be generated by category module 122 or manually generated by a user. The list shown in table 1 is an example only and can include additional fault tolerance parameter. One fault tolerance parameter shown in table 1 is application monitoring. Table 1 also shows which high-availability providers are configured to provide the fault tolerance parameters, e.g., perform application monitoring. In this example, high-availability providers 1, 2, 4, and 5 perform application monitoring. High-availability providers 3, 6, and 7 do not.

Index module 124 is also configured to detect which high-availability providers 156 apply to each application 154. A high-availability provider applies to a given application if the high-availability provider provides at least one fault tolerance protection to the application. In one embodiment, index module 124 creates a table, such as table 2, for the applications in the datacenter. The table includes information that identifies which fault tolerance parameters are enabled for the applications and which high-availability provider(s) provides the fault tolerance parameter to the application.

TABLE 2

| Application | FTP | Enabled? | HA Provider |
|---|---|---|---|
| Application 1 | FTP 1 | Yes | Provider 1, Provider 2 |
|  | FTP 2 | No |  |

TABLE 1

| Fault Tolerance Parameter | Provider 1 | Provider 2 | Provider 3 | Provider 4 | Provider 5 | Provider 6 | Provider 7 |
|---|---|---|---|---|---|---|---|
| Application Monitoring | ✓ | ✓ |  | ✓ | ✓ |  |  |
| Application Restart | ✓ | ✓ |  | ✓ | ✓ |  |  |
| Application Failover |  | ✓ |  |  | ✓ |  |  |
| Virtual Machine Monitoring |  |  | ✓ | ✓ | ✓ |  |  |
| Virtual Machine Restart on App Fault | ✓ |  |  | ✓ | ✓ |  |  |
| Virtual Machine Failover on App fault |  |  |  |  | ✓ |  |  |
| Virtual Machine Failover on VM fault |  |  |  |  | ✓ |  |  |
| Virtual Machine Failover on physical Server fault |  |  | ✓ | ✓ | ✓ |  |  |
| Virtual Machine protection with no down time on physical server fault |  |  |  |  | ✓ |  |  |
| Data Integrity |  | ✓ |  |  | ✓ |  |  |
| Campus |  | ✓ |  |  | ✓ |  |  |
| DR |  | ✓ |  |  | ✓ |  | ✓ |
| Storage/network fault |  | ✓ |  |  |  |  |  |
| Reverting to last-known-good snapshot on Application Fault |  |  |  |  |  |  |  |

Datacenter management application 120 also includes an index module 124. Index module 124 is configured to generate an index value for applications 154. In one embodiment, calculating an index value involves index module 124 detecting which fault tolerant parameters apply to a given application and generating an index value based on the fault tolerance parameters that apply to the application. For example, an index value can be a value on a scale, such as one through ten, that indicates the degree of fault tolerance provided for an application with a low value, such as one, indicating that the application is less fault tolerant and a high value, such as nine, indicating that the application is more fault tolerant (or vice versa). In one example, each fault tolerance parameter has an associated value, and index module 124 calculates the index value for an application by adding the associated values for each fault tolerance parameter provided for the application. The index value is an objective measure that provides a way for a datacenter administrator to quickly assess: a) how fault tolerant a given application in a datacenter is relative to other applications in the datacenter; and b) the datacenter's fault tolerance capabilities. In one embodiment, an index value is calculated for a group of applications, a computing system, or a group of computing systems. Index values can be numerical, alphabetical, descriptive (e.g., gold, silver, bronze), or any other value that allows different index values to be distinguished from each other while conveying the level of relative fault tolerance of an application.

TABLE 2-continued

| Application | FTP | Enabled? | HA Provider |
|---|---|---|---|
|  | FTP 3 | Yes | Provider 3 |
|  | FTP 4 | Yes | Provider 3 |
|  | FTP 5 | Yes | Provider 5 |

Category module 122 and index module 124 are configured to transmit information regarding the categorization of high-availability providers and information regarding the index values for each application to a storage device 140. Storage device 140 stores the information in configuration information 142. Storage device 140 provides persistent data storage, such that data stored on storage device 140 will remain stored even after the storage device is powered off. Storage device 140 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Storage device 140 can also be a virtual or logical storage device that is implemented on such physical storage devices and/or storage systems. For example, storage device 140 can be a logical volume that is implemented on a RAID storage system. Additionally, storage device 140 can include one or more storage devices. Storage device 140 can also include one or more types of storage media, including solid state media (e.g., flash drives), optical media (e.g., CDs and DVDs), and magnetic media (e.g., hard disks or magnetic tape). In some embodiments, storage device 140 can be implemented using cloud storage, in which the storage device is a logical storage device to which physical storage device(s) are allocated on an as-needed and/or as-contracted basis.

Datacenter management application 120 also includes a display module 126. Display module 126 is configured to organize and display information regarding applications 154, and the high-availability configuration thereof, such as index values associated with applications 154. Display module 126 is configured to generate a graphical user interface that includes selectable fields that enable a user to selectively display high-availability configuration information and to filter and sort the high-availability configuration information.

Figure 2:
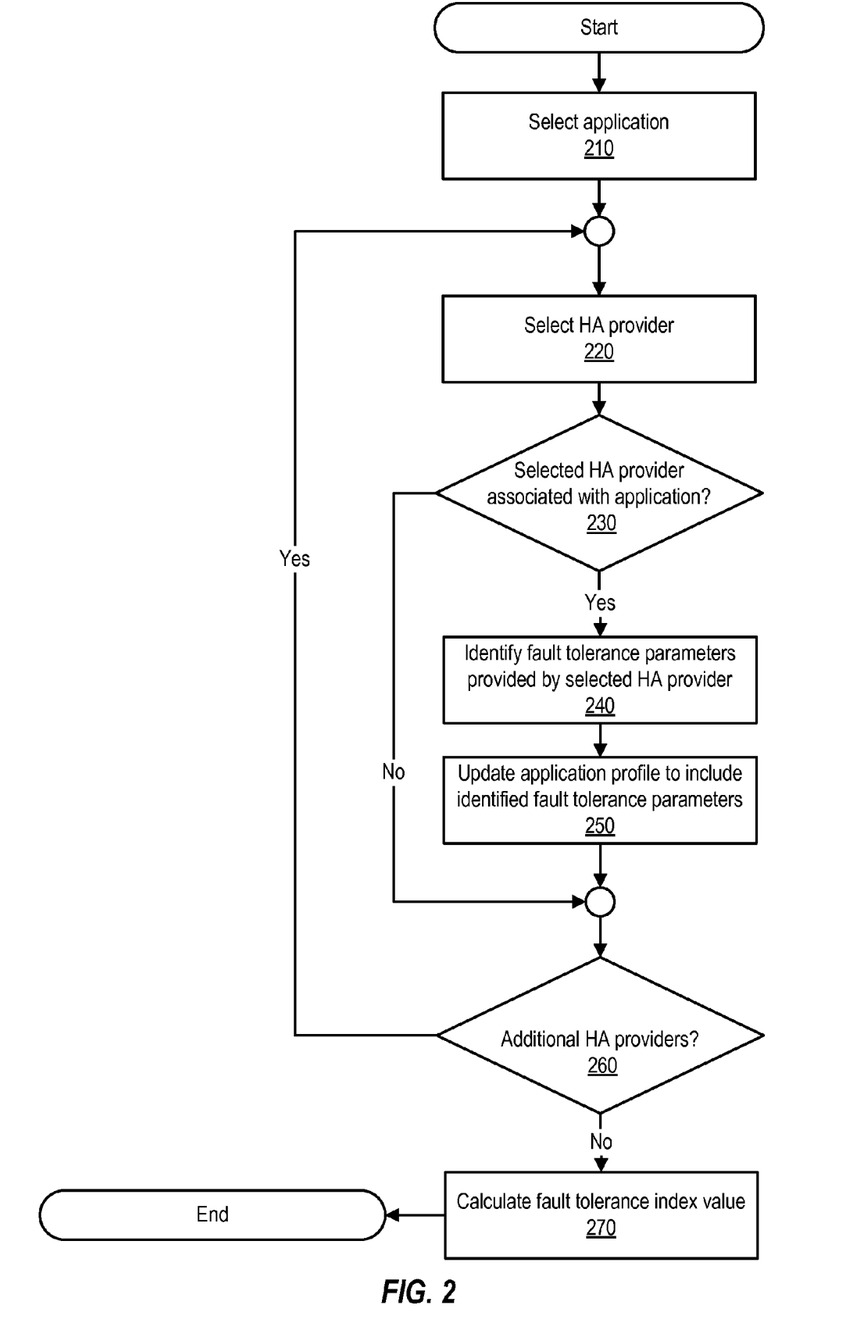
FIG. 2 is a flowchart of a method of generating a fault tolerance index value for an application, according to one embodiment.

FIG. 2 is a flowchart of a method of calculating a fault tolerant index value for one or more applications, such as applications 154 of FIG. 1. The method can be performed by a datacenter management application, such datacenter management application 120 of FIG. 1. In one embodiment, the datacenter management application calculates an index value for a computing system, such as s 150 of FIG. 1, or for a site, such as a datacenter.

The method begins at 210, when the datacenter management application selects one of the applications. The datacenter management application can select an application in response, for example, to receiving a query from a datacenter administrator. Alternatively, the datacenter management application can automatically select an application, for example, in response to detecting an event, such as the application being installed, expiration of a pre-specified time period, and the like. For example, the datacenter management application can be configured to periodically calculate an index value for some or all of the applications managed by the datacenter management application. In one embodiment, the datacenter management application performs a visualization operation, which involves detecting status information of one or more applications that are implemented in the datacenter. The visualization operation can involve the datacenter management application requesting configuration information from one or more computing systems in the datacenter, and/or examining configuration information.

At 220, the datacenter management application selects a high-availability provider, such as a high-availability provider 156 of FIG. 1. In one embodiment, the datacenter examines configuration information associated with the computing systems in the datacenter. Based on the configuration information, the datacenter management application generates a list of high-availability providers included in the datacenter. The datacenter management application sorts the high-availability providers, for example, based on the computing system(s) which the high-availability providers are associated with, the fault tolerance parameter provided by the high-availability providers, and the like. The datacenter management application can select a high-availability provider based on an in-order traversal of the list of high-availability providers.

At 230, the datacenter management application detects whether the selected high-availability provider is associated with the selected application. In one embodiment, this involves accessing configuration information, such as configuration information 142 of FIG. 1. The datacenter management application can access configuration information of the high-availability provider and/or configuration information of the application. In one embodiment, the high-availability provider maintains configuration information, such as a list, that includes information that identifies applications that are protected by the high-availability provider. The datacenter management can search this information, or query the high-availability provider or application, to detect whether the high-availability provider is associated with the application.

An application can be associated with a high-availability provider in a number of ways. An application, such as application 154 of FIG. 1, can be configured to take advantage of features of a high-availability provider, such high-availability provider 156 of FIG. 1. The application configuration can be modified to indicate that the application is enabled to utilize features provided by the high-availability provider. In one embodiment, the high-availability provider's configuration information is also modified to indicate that the application is provided with one or more of the fault tolerance features provided by the high-availability provider. Configuring the high-availability provider can involve configuring some or all of the fault tolerance features available from the high-availability provider to apply to the given application.

If the datacenter management application detects that the selected high-availability provider is associated with the application, the datacenter management application identifies fault tolerance parameters provided by the selected high-availability provider to the selected application at 240. This can involve the datacenter management application matching the fault tolerance parameters listed in the high-availability provider's configuration information with a list of fault tolerance parameters, e.g., a list of fault tolerance parameters created by a datacenter administrator.

In response to detecting that a given fault tolerance parameter is provided for an application by the selected high-availability provider, the datacenter management application, the datacenter management application updates, at 250, a profile associated with the application to include information indicating that the identified fault tolerance parameters are associated with the application. The datacenter management application also updates the profile to identify the high-availability provider that provides the fault tolerance parameter.

At 260, the datacenter management application detects whether additional high-availability providers are implemented in the datacenter. If so, the method returns to 220. Otherwise, at 270 the datacenter management application calculates a fault tolerance index value for the application. An index module, such as index module 124 of FIG. 1, calculates the fault tolerance index value based, for example, on the fault tolerance parameters configured for the application.

Figure 3:
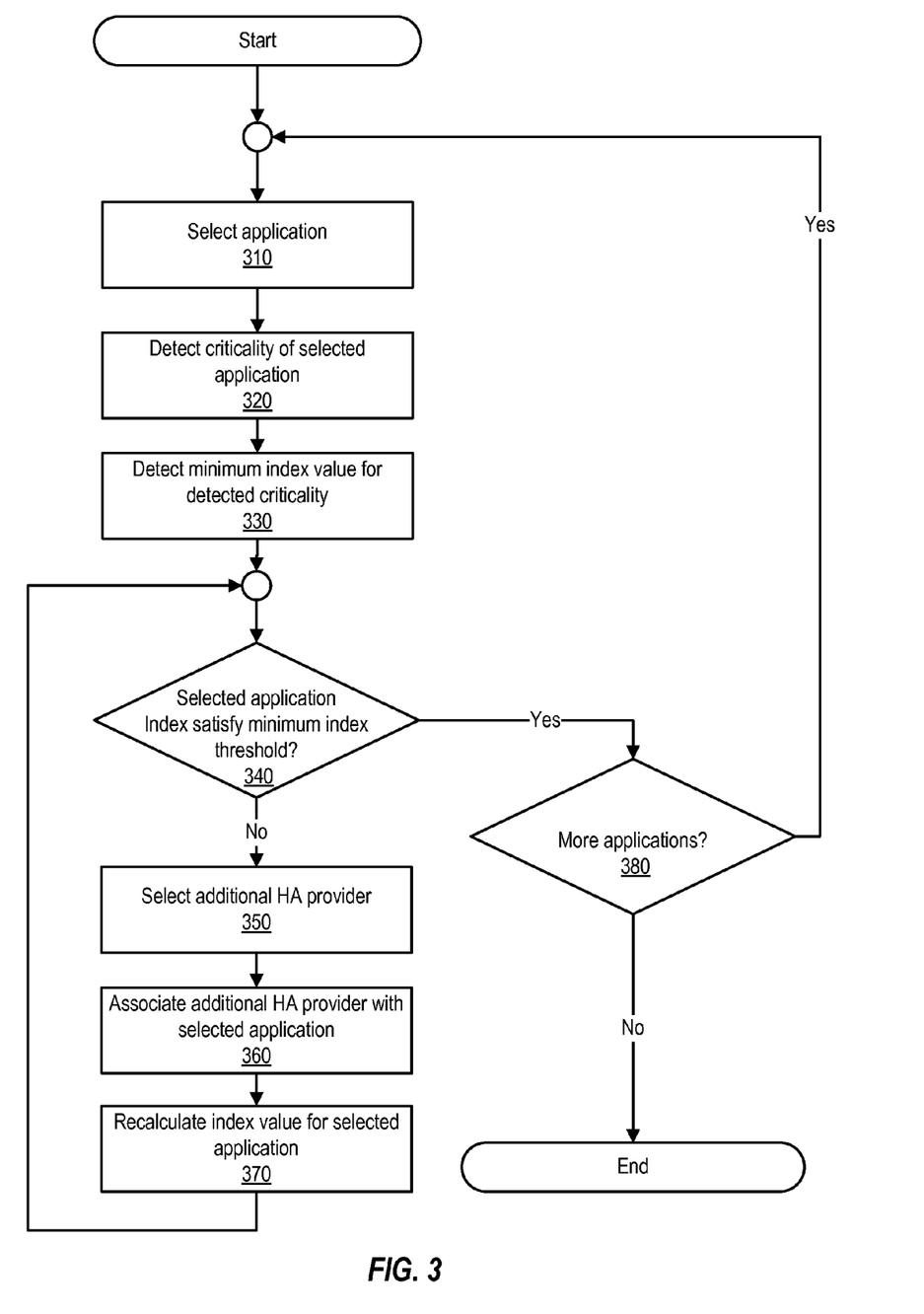
FIG. 3 is a flowchart of a method of configuring a datacenter based on high-availability criteria, according to one embodiment.

FIG. 3 illustrates a method of configuring a datacenter based on fault tolerance parameters of one or more applications included in the datacenter. The method can be performed by a datacenter management application, such as datacenter management application 120 of FIG. 1.

At 310, the datacenter management application selects an application, such as application 154 of FIG. 1. The datacenter management application can select an application in response to receiving a request from a user, such as a datacenter administrator. In one embodiment, the datacenter management application selects an application based on a traversal of a list of applications implemented in the datacenter.

At 320, the datacenter management application detects a criticality of the selected application. The datacenter administrator can supply a criticality factor or value for each application. The criticality information for each application can be stored, for example in configuration information, such as configuration information 142 of FIG. 1. In one embodiment, determining how critical an application is involves accessing configuration information for the application. The configuration information includes information indicating how much down-time the application can tolerate, how quickly the application should be restored following an interruption of service, and the like. The datacenter management application can use this information to calculate the criticality value for the application.

At 330, the datacenter management application detects a minimum index value associated with the detected criticality at 330. For example, the datacenter administrator can specify that for a given criticality factor value the application should have an index value that meets or exceeds a specified value. The datacenter management application can operate based on a general principle that the more critical the application, the higher the index value should be. Based on this principle, the datacenter management application can detect and correct misconfigurations. For example, the datacenter management application can compare criticality values for a first application and a second application. If the first application has a higher criticality value than the second application, the first application should also have a higher index value than the second application. This would indicate that the first application, which is more critical, has a higher degree of fault tolerance protection. However, if datacenter management application detects that the first, more critical, application, has a lower index value (e.g., less fault tolerance protection) the datacenter management application can reconfigure the first application and/or the second application in response to detecting the mismatch. For example, the datacenter management application can reconfigure the first application and/or one or more high-availability providers to increase the first application's index value (e.g., add additional fault tolerance protection to the first application). The datacenter management application can also, or as an alternative, decrease the second application's index value (e.g., reduce the degree of fault tolerance protection of the second application).

The datacenter management application detects, at 340, whether the selected application has an index value that satisfies the minimum index value threshold. The datacenter management application can generate a list of acceptable index values for each criticality value. For example, the list can specify a desired range of index values for a given criticality value. The datacenter management application compares the selected application's criticality value and index value and detects whether the application's index value is within the acceptable range of index values for the application's criticality. If so, no reconfiguration is performed and the datacenter management application detects, at 380, whether additional applications exist. If so, the method returns to 310, and the datacenter management application selects another application.

If the datacenter management application detects that the selected application's index value is outside the acceptable range, at 350, the datacenter management application reconfigures the application and/or one or more high-availability providers to provide additional fault tolerance protection to the application, thus increasing the application's index value. The datacenter management application can also generate an indication or warning to notify the datacenter administrator of the condition. To reconfigure the application, the datacenter management application selects an additional high-availability provider, at 350. The datacenter management application can select the additional high-availability provider randomly, based on an in order traversal of a list of available high-availability providers to the datacenter, based on one or more fault tolerance parameters provided by the high-availability provider, or based on some other datacenter management criteria. For example, an algorithm can specify a list of fault tolerance parameters in an order in which the fault tolerance parameters should be added to applications whose index values are lower than is permitted.

The datacenter management application associates the selected additional high-availability provider with the selected application at 360. In one embodiment, this involves configuring the application and/or the high-availability provider.

At 370, the datacenter management application recalculates an index value for the selected application. The recalculation can be performed, for example, by an index module, such as the index module 124 of FIG. 1. In one embodiment, the index module calculates the index value using the same algorithm as was previously used to calculate the index module, as described above with regard to FIG. 2. After the index module recalculates the index value, the method returns to 340 and the datacenter management application detects whether the selected application's index value now satisfies the minimum index threshold for applications having the criticality value associated with the application.

In one embodiment, the datacenter management application detects that the application's index value is higher than an acceptable range of index values associated with the application's criticality. In response to this detection, the datacenter management can reconfigure the application and/or one or more high-availability providers to reduce the amount of fault tolerance protection provided to the application, thus reducing the application's index value.

Figure 4:
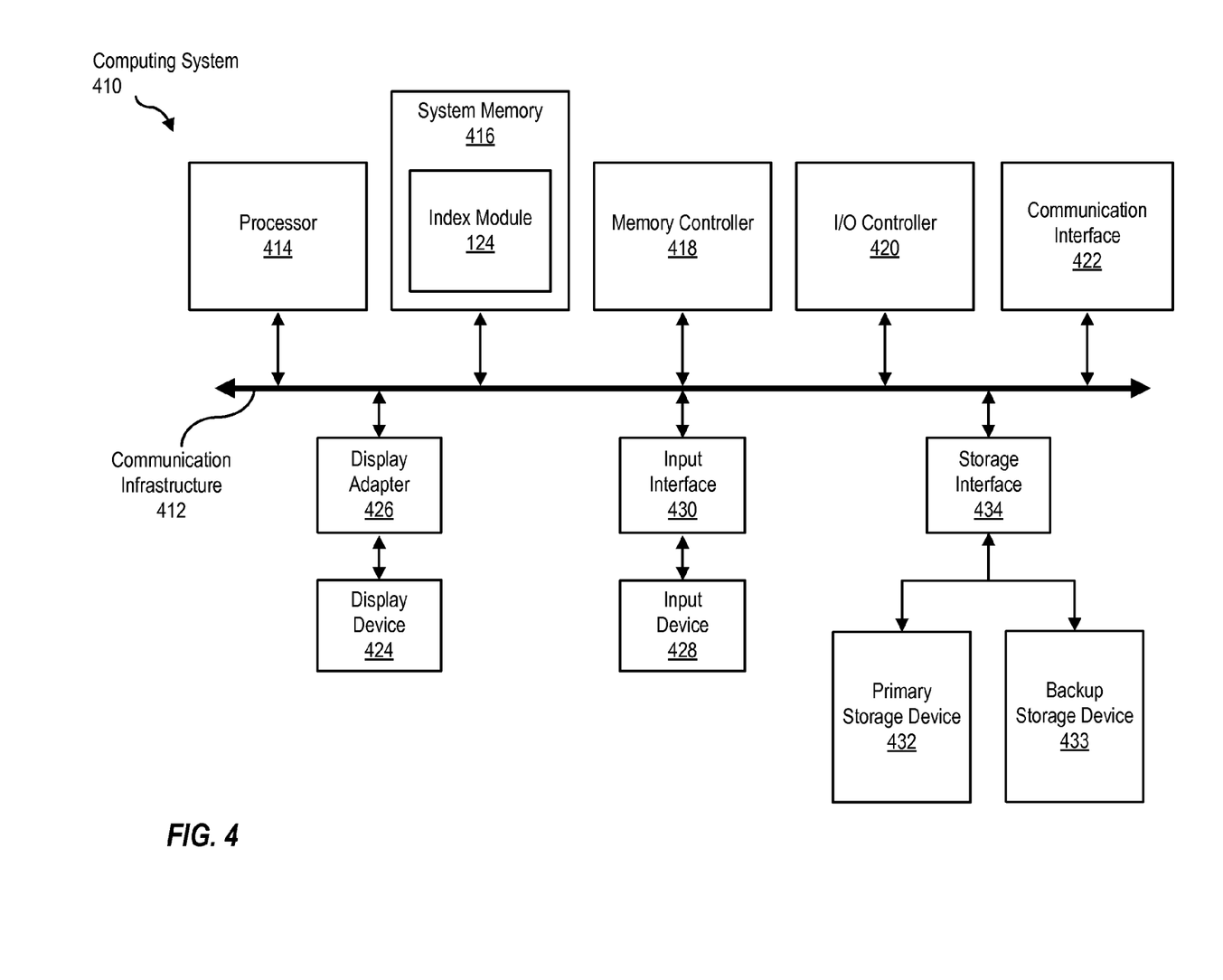
FIG. 4 is a block diagram of a computing device, illustrating how an index module can be implemented in software, according to one embodiment.

FIG. 4 is a block diagram of a computing system 410, capable of performing I/O operations to a virtual disk in a local storage device, while the virtual disk is being restored from a backup storage device as described above. Computing system 410 broadly represents any single or multi-processor computing device or system capable of executing computer-readable instructions. Examples of computing system 410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 410 may include at least one processor 414 and a system memory 416. By executing the software that implements an index module 124, computing system 410 becomes a special purpose computing device that is configured to calculate index values in the manner described above.

Processor 414 generally represents any type or form of processing unit capable of processing data or interpreting and executing instructions. In certain embodiments, processor 414 may receive instructions from a software application or module. These instructions may cause processor 414 to perform the functions of one or more of the embodiments described and/or illustrated herein. For example, processor 414 may perform and/or be a means for performing the operations described herein. Processor 414 may also perform and/or be a means for performing any other operations, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, program instructions executable to implement an index module (e.g., as shown in FIG. 1) may be loaded into system memory 416.

In certain embodiments, computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the operations or features described and/or illustrated herein.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 4100, and storage interface 4104.

Communication interface 422 broadly represents any type or form of communication device or adapter capable of facilitating communication between computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11044 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer) for display on display device 424.

As illustrated in FIG. 4, computing system 410 may also include at least one input device 428 coupled to communication infrastructure 412 via an input interface 430. Input device 428 generally represents any type or form of input device capable of providing input, either computer or human generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. A storage device like primary storage device 432 can store information such as high-availability configuration information.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4.

Computing system 410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 410 for storage in memory via a network such as the Internet or upon a carrier medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 410 may be configured as an application specific integrated circuit (ASIC) adapted to implement one or more of the embodiments disclosed herein.

Figure 5:
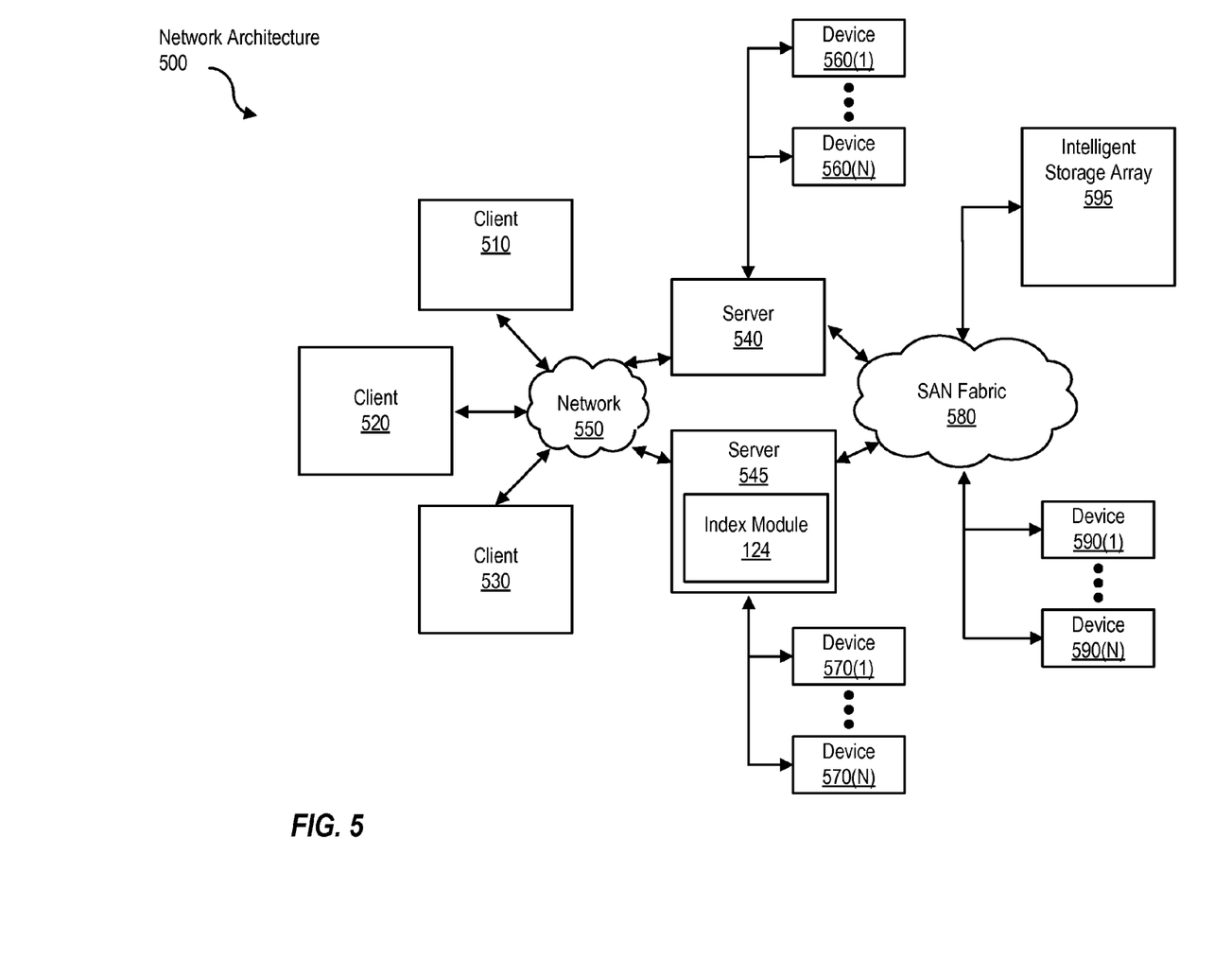
FIG. 5 is a block diagram of a networked system, illustrating how various computing devices can communicate via a network, according to one embodiment.

FIG. 5 is a block diagram of a network architecture 500 in which client systems 510, 520, and 530 and servers 540 and 545 may be coupled to a network 550. Client systems 510, 520, and 530 generally represent any type or form of computing device or system, such as computing system 410 in FIG. 4.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, one or more of client systems 58, 520, and/or 530 may include an index module 124 as shown in FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as Network File System (NFS), Server Message Block (SMB), or Common Internet File System (CIFS). Such storage devices can store backup information and storage configuration information, as described above.

Servers 540 and 545 may also be connected to a storage area network (SAN) fabric 580. SAN fabric 580 generally represents any type or form of computer network or architecture capable of facilitating communication between multiple storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 540, server 545, storage devices 540(1)-(N), storage devices 570(1)-(N), storage devices 590(1)-(N), intelligent storage array 595, or any combination thereof. All or a portion of one or more of the embodiments disclosed herein may also be encoded as a computer program, stored in server 540, run by server 545, and distributed to client systems 510, 520, and 530 over network 550.

In some examples, all or a portion of one of the systems in FIGS. 1, 4, and 5 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an index module may transform the behavior of a high-availability datacenter such that an index value is created and used to manage the datacenter.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 detecting a plurality of fault tolerance parameters potentially available within a datacenter;
 identifying a set of at least one fault tolerance parameter from the plurality of fault tolerance parameters, wherein each fault tolerance parameter of the set applies to an application,
  the identifying comprises detecting that at least one high-availability application of a plurality of high-availability applications currently executing in the datacenter is associated with the application, and
  the at least one high-availability application provides the at least one fault tolerance parameter for the application when associated with the application;

generating an index value for the application, wherein
the index value is based on the set,
the index value comprises an objective measure of fault tolerance associated with the application, and
the detecting, the identifying, and the generating are performed by a datacenter management module executing on a computing device.

2. The method of claim 1, further comprising:
detecting a required minimum index value for the application, wherein
the minimum index value is based on a criticality indicator for the application.

3. The method of claim 2, further comprising:
comparing the index value and the minimum index value; and
reconfiguring the fault tolerance provided to the application in response to detecting that the index value is less than the minimum index value.

4. The method of claim 3, wherein
the reconfiguring comprises associating the application with an additional high-availability application of the plurality of high-availability applications.

5. The method of claim 1, further comprising:
creating a mapping, wherein the mapping identifies
at least one fault tolerance parameter,
an indication of whether the fault tolerance parameter is enabled for the application, and
information identifying one or more of the plurality of high-availability applications that provides the fault tolerance parameter for the application.

6. The method of claim 1, wherein
a number of levels of high-availability protection is proportional to the index value.

7. The method of claim 1, further comprising:
mapping each of the fault tolerance parameters to at least one capable high-availability application, wherein
the at least one capable high-availability application is configured to provide the respective fault tolerance parameter to the application.

8. The method of claim 1, wherein
the set identifies fault tolerance parameters provided by high-availability applications that operate at different organizational levels.

9. A non-transitory computer readable storage medium storing program instructions executable to:
detect a plurality of fault tolerance parameters potentially available within a datacenter;
identify a set of at least one fault tolerance parameter from the plurality of fault tolerance parameters, wherein
each fault tolerance parameter of the set applies to an application,
identifying the set comprises detecting that at least one high-availability application of a plurality of high-availability applications currently executing in the datacenter is associated with the application, and
the at least one high-availability application provides the at least one fault tolerance parameter for the application when associated with the application;
generate an index value for the application, wherein
the index value is based on the set, and
the index value comprises an objective measure of fault tolerance associated with the application.

10. The non-transitory computer readable storage medium of claim 9, wherein the instructions are further executable to:
detect a required minimum index value for the application, wherein
the minimum index value is based on a criticality indicator for the application.

11. The non-transitory computer readable storage medium of claim 10, wherein the instructions are further executable to:
compare the index value and the minimum index value; and
reconfigure the fault tolerance provided to the application in response to detecting that the index value is less than the minimum index value.

12. The non-transitory computer readable storage medium of claim 11, wherein
reconfiguring the fault tolerance provided to the application comprises associating the application with an additional high-availability application of the plurality of high-availability applications.

13. The non-transitory computer readable storage medium of claim 9, wherein the instructions are further executable to:
create a mapping, wherein the mapping identifies
at least one fault tolerance parameter,
an indication of whether the fault tolerance parameter is enabled for the application, and
information identifying one or more of the plurality of high-availability applications that provides the fault tolerance parameter for the application.

14. The non-transitory computer readable storage medium of claim 9, wherein a number of levels of high-availability protection is proportional to the index value.

15. The non-transitory computer readable storage medium of claim 9, wherein the instructions are further executable to:
map each of the fault tolerance parameters to at least one capable high-availability application, wherein
the at least one capable high-availability application is configured to provide the respective fault tolerance parameter to the application.

16. A system comprising:
one or more processors; and
a memory coupled to the one or more processors, wherein the memory stores program instructions executable by the one or more processors to:
detect a plurality of fault tolerance parameters potentially available within a datacenter;
identify a set of at least one fault tolerance parameter from the plurality of fault tolerance parameters, wherein
each fault tolerance parameter of the set applies to an application,
identifying the set comprises detecting that at least one high-availability application of a plurality of high-availability applications currently executing in the datacenter is associated with the application, and
the at least one high-availability application provides the at least one fault tolerance parameter for the application when associated with the application;
generate an index value for the application, wherein
the index value is based on the set, and
the index value comprises an objective measure of fault tolerance associated with the application.

17. The system of claim 16, wherein the instructions are further executable to:
detect a required minimum index value for the application, wherein
the minimum index value is based on a criticality indicator for the application.

18. The system of claim 17, wherein the instructions are further executable to:
compare the index value and the minimum index value; and reconfigure the fault tolerance provided to the application in response to detecting that the index value is less than the minimum index value.

19. The system of claim 18, wherein reconfiguring the fault tolerance provided to the application comprises associating the application with an additional high-availability application of the plurality of high-availability applications.

20. The system of claim 16, wherein the instructions are further executable to:
    create a mapping, wherein the mapping identifies
        at least one fault tolerance parameter,
        an indication of whether the fault tolerance parameter is enabled for the application, and
        information identifying one or more of the plurality of high-availability applications that provides the fault tolerance parameter for the application.

\* \* \* \* \*